United States Patent
Kwon

(10) Patent No.: US 10,460,232 B2
(45) Date of Patent: Oct. 29, 2019

(54) METHOD AND APPARATUS FOR CLASSIFYING DATA, AND METHOD AND APPARATUS FOR SEGMENTING REGION OF INTEREST (ROI)

(71) Applicant: Samsung Electronics Co., Ltd., Suwon-si (KR)

(72) Inventor: Keun Joo Kwon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 996 days.

(21) Appl. No.: 14/944,717

(22) Filed: Nov. 18, 2015

(65) Prior Publication Data

US 2016/0162805 A1 Jun. 9, 2016

(30) Foreign Application Priority Data

Dec. 3, 2014 (KR) ........................ 10-2014-0172347

(51) Int. Cl.
*G06N 3/08* (2006.01)
*G06N 3/04* (2006.01)

(52) U.S. Cl.
CPC ............. *G06N 3/08* (2013.01); *G06N 3/0445* (2013.01); *G06N 3/0454* (2013.01)

(58) Field of Classification Search
CPC ........... G06K 9/00456; G06K 9/00463; G06K 9/00778; G06K 9/00; G06K 9/0008; G06K 9/00087; G06K 9/0014; G06K 9/00147; G06K 9/00228; G06K 9/00476; G06K 9/00496; G06K 9/00604; G06F 19/00; G06F 3/013; G06F 3/017; G06F 3/04842; G06F 12/08; G06F 12/121; G06F 12/123; G06F 12/126; G06F 17/3066; G06F 1/3228; G06F 1/329; G06F 9/4893; G16H 50/20; G16H 40/40; G16H 50/50; A61B 2576/00;
(Continued)

(56) References Cited

U.S. PATENT DOCUMENTS

| | | | |
|---|---|---|---|
| 5,850,470 A | 12/1998 | Kung et al. | |
| 9,720,934 B1* | 8/2017 | Dube | G06K 9/00805 |
| 2006/0111900 A1 | 5/2006 | Kim | |
| 2009/0304290 A1* | 12/2009 | Fukaya | G06K 9/00228 |
| | | | 382/224 |

(Continued)

FOREIGN PATENT DOCUMENTS

JP 8-241092 A 9/1996
JP 5207870 B2 6/2013
(Continued)

OTHER PUBLICATIONS

Rumelhart D. et al., "Learning representations by back-propagating errors," Cognitive modeling, vol. 323, Oct. 9, 1986 (4 pages).
(Continued)

*Primary Examiner* — Alan Chen
(74) *Attorney, Agent, or Firm* — NSIP Law

(57) ABSTRACT

A method and an apparatus are described to classify data. The method and apparatus includes selecting a hypothesis class among entire classes. The method and corresponding apparatus generate output data with regard to the entire classes by applying a classification algorithm to input data, and modify the input data to increase a value of the hypothesis class among the output data in response to a re-classification condition being met. The modified input data is set to be new input data.

26 Claims, 8 Drawing Sheets

(58) Field of Classification Search
CPC ....... A61B 3/113; A61B 5/044; A61B 5/0452; A61B 5/742; A61B 8/08; A61B 8/10; A61B 8/469; A61B 8/5223; A61B 5/04012; A61B 5/046; A61B 5/0464; A61B 5/7267; G06N 3/0454; G06N 3/0445; G06N 3/08; G06N 3/084; G06N 7/005; H04L 47/14; H04L 47/24; H04L 47/25; Y02D 10/24
See application file for complete search history.

(56) References Cited

U.S. PATENT DOCUMENTS

| | | | |
|---|---|---|---|
| 2010/0111396 A1* | 5/2010 | Boucheron | G06K 9/0014 382/133 |
| 2011/0164815 A1 | 7/2011 | Sharma et al. | |
| 2012/0127267 A1* | 5/2012 | Zhang | G06T 7/579 348/43 |
| 2016/0156579 A1* | 6/2016 | Kaufmann | H04L 51/22 709/206 |

FOREIGN PATENT DOCUMENTS

| | | |
|---|---|---|
| KR | 10-0631608 B1 | 9/2006 |
| KR | 10-2011-0055347 A | 5/2011 |
| KR | 10-2012-0052778 A | 5/2012 |
| KR | 10-1174048 B1 | 8/2012 |

OTHER PUBLICATIONS

Forsyth, D. et al., "Computer Vision: A Modern Approach," Second Edition, Pearson, 2003 (30 pages).

Felzenszwalb, P. et al., "Object detection with discriminatively trained part-based models," IEEE Transactions on Pattern Analysis and Machine Intelligence, vol. 32, No. 9, 2010 (pp. 1627-1645).

Krizhevsky, A. et al., "Imagenet classification with deep convolutional neural networks," Advances in neural information processing systems, 2012, (27 pages).

McClelland, J., "Integrating probabilistic models of perception and interactive neural networks: a historical and tutorial review," Frontiers in psychology, 2013 (37 pages).

Graves, A. et al., "Speech recognition with deep recurrent neural networks," IEEE International Conference on Acoustics, Speech and Signal Processing (ICASSP), held in Ontario, CA, 2013 (5 pages).

Sermanet, P. et al., "Overfeat: Integrated recognition, localization and detection using convolutional networks," arXiv preprint arXiv:1312.6229, 2013 (16 pages).

* cited by examiner

METHOD AND APPARATUS FOR CLASSIFYING DATA, AND METHOD AND APPARATUS FOR SEGMENTING REGION OF INTEREST (ROI)

CROSS-REFERENCE TO RELATED APPLICATION(S)

This application claims the benefit under 35 U.S.C. § 119(a) of Korean Patent Application No. 10-2014-0172347, filed on Dec. 3, 2014, in the Korean Intellectual Property Office, the entire disclosure of which is incorporated herein by reference for all purposes.

BACKGROUND

1. Field

The following description relates to a method and an apparatus to classify data and segmenting region of interests (ROI), and more particularly, to a method and an apparatus using a hypothesis to classify data and segmenting the ROI on a basis of a gradient.

2. Description of the Related Art

Generally, an object is detected from given data through machine learning so as to classify to which class the detected object belongs. In one example, for the general machine learning method to classify data, there are the following representative methods: neural networks, convolutional neural networks (CNNs), support vector machines (SVMs), logistic regression, and nearest neighbors. Also, for a general method to detect data, specified methods according to data types exist. For example, a method to detect image data includes scale-invariant feature transform (SIFT), deformable part model (DPM). A method to detect audio data includes a recurrent neural network (RNN).

Above this, the various methods for detecting and classifying an object from data enunciated above perform tests on every available position of data, thereby causing an increase in test duration and a reduction in detection accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a method of classifying data, including selecting a hypothesis class among entire classes; generating output data with regard to the entire classes by applying a classification algorithm to input data; modifying the input data to increase a value of the hypothesis class among the output data in response to a re-classification condition being met; and setting the modified input data to be new input data.

The re-classification condition may include at least one of a value of the hypothesis class being lower than a preset threshold and a value of the hypothesis class being lower than a preset number of the re-classifications.

The method may also include outputting the input data and the output data in response to the determination that the re-classification condition is not met.

The modifying of the input data may include defining a loss function of the classification algorithm using the hypothesis class, calculating a gradient vector of the defined loss function, and modifying the input data on a basis of the gradient vector.

The modifying of the input data may include reducing each value of the input data by a preset positive value in a direction a gradient.

The modifying of the input data on a basis of the gradient vector may include for each value of the input data, modifying to 0 a value of the input data in which a result from multiplying a sign and a gradient of each value is greater than or equal to a reference value, or a value of the input data, in which an absolute value of the gradient is greater than or equal to the reference value.

The modifying of the input data on a basis of the gradient vector may include reducing, in the direction in which a gradient descends, each value of the input data by a positive value.

The method may also include generating initial output data of the entire classes by applying the classification algorithm to the received input data, and the selecting of the hypothesis class is performed on a basis of a size of each value of the initial output data.

The classification algorithm may be one of a neutral network, a convolutional neutral network (CNN), and a recurrent neural network (RNN).

In accordance with an embodiment, there is provided an apparatus to classify data, including a hypothesis class selector configured to select one hypothesis class among entire classes; a data classifier configured to generate output data with regard to the entire classes by applying a classification algorithm to input data; and a data setter configured to modify input data to increase a value of the hypothesis class among the output data and set the modified input data to new input data in response to a determination that a re-classification condition is met.

The re-classification condition may include at least one of a value of the hypothesis class being lower than a preset threshold and a value of the hypothesis class being lower than a preset number of the re-classifications.

In response to a determination that the re-classification condition is not met, further including a result output configured to output the input data and the output data.

The data setter may also include a loss function definer configured to define a loss function of the classification algorithm by using the hypothesis class, a gradient calculator configured to calculate a gradient vector with respect to the defined loss function, and a data modifier configured to modify the input data on a basis of the gradient vector.

The data modifier may be configured to reduce each value of the input data by a preset positive in a direction of a gradient.

The data modifier may be configured to, for each value of the input data, modify to 0 a value of the input data in which a result from multiplying a sign and a gradient of each value is greater than or equal to a reference value, or a value of the input data in which an absolute value of the gradient is greater than or equal to the reference value.

The data modifier may modify the input data on a basis of the gradient vector by reducing, in the direction in which a gradient descends, each value of the input data by a positive value.

The hypothesis class selector may be configured to generate initial output data with respect to the entire classes by applying the classification algorithm to the received input data and select the hypothesis class on a basis of a size of each value of the initial output data.

The classification algorithm may be one of a neutral network, a convolutional neutral network (CNN), and a recurrent neural network (RNN).

In accordance with an embodiment, there is provided a method of segmenting a region of interest (ROI), including selecting one hypothesis class among entire classes; generating output data with regard to the entire classes by applying a classification algorithm to input data; modifying the input data to increase a value of the hypothesis class among the output data; and segmenting, as ROIs, an area from the modified input data based on the modifying.

The method may also include in response to a determination that the ROI is to be re-segmented, generating new input data that includes the segmented area that is continuous; and repeatedly performing operations subsequent to the generating of the output data.

The segmenting of the area may include segmenting a continuous area, of which a value is increased as ROIs from the modified input data by using a segmentation algorithm.

The segmentation algorithm may include at least one of a graph cut algorithm and a conditional random field (CRF) algorithm.

The modifying of the input data may include defining a loss function of the classification algorithm using the hypothesis class; calculating a gradient vector of the defined loss function; and modifying the input data based on the gradient vector.

In accordance with an embodiment, there is provided an apparatus to segment a region of interest (ROI), including a hypothesis class selector configured to select a hypothesis class among entire classes; a data classifier configured to generate output data about the entire classes by applying a classification algorithm to input data; a data setter configured to modify the input data to increase a value of the hypothesis class among the output data and outputting a modification result indicative thereof; and an ROI segmentor configured to segment, as ROIs, an area from the modified input data based on the modification result.

In response to a determination that the ROI is to be re-segmented, the data setter may be configured to generate new input data that includes the one or more segmented areas.

The ROI segmentor may be configured to segment a continuous area, of which values are increased, as ROIs from the modified input data using a segmentation algorithm.

The segmentation algorithm may include at least one of a graph cut algorithm and a conditional random field (CRF) algorithm.

The data setter may include a loss function definer configured to define a loss function of the classification algorithm using the hypothesis class; a gradient calculator configured to calculate a gradient vector of the defined loss function; and a data modifier configured to modify the input data on a basis of the gradient vector.

Other features and aspects will be apparent from the following detailed description, the drawings, and the claims.

Figure 1:
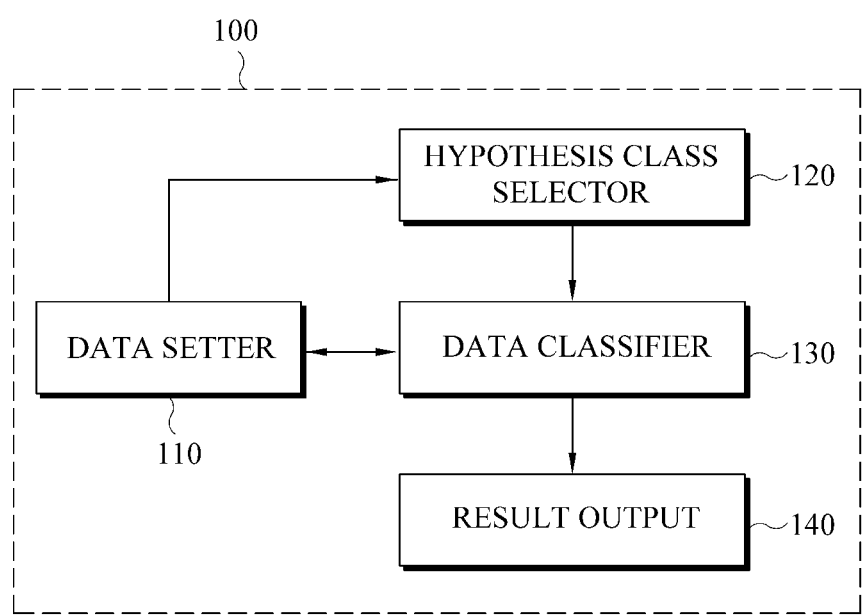
FIG. 1 is a diagram illustrating an apparatus to classify data, according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 is a diagram illustrating an apparatus to classify data, according to an embodiment.

Referring to FIG. 1, an apparatus 100 to classify data includes a data setter 110, a hypothesis class selector 120, a data classifier 130, and a result output 140.

The data setter 110 receives initial input data to be classified, and modifies the input data if re-classification is required. In one example, the input data includes different types of data, such as a voice or an image.

In addition, the received initial input data $°x$, as represented by the following Equation 1, is defined as a vector of which the length is k.

$$°x=(x_1,x_2,\ldots x_k) \qquad \text{[Equation 1]}$$

If the initial input data $°x$ is received, the data setter 110 sets the initial input data $°x$ to the present input data x for the classification.

The hypothesis class selector 120 selects one hypothesis class among entire classifiable classes so as to classify the initial input data $°x$. In one example, the hypothesis class represents one class, to which the initial input data $°x$ is predicted to belong, among the entire classes.

The hypothesis class selector 120 receives a user's input and selects, as the hypothesis class, one class that the user has selected among the entire classes. If the initial input data $°x$ is received, the hypothesis class selector 120 outputs initial output data by performing a classification algorithm on the initial input data, and selects a hypothesis class based on an order of the size of each value of the output data. For example, the hypothesis class selector 120 selects, as the hypothesis class, a class that has the largest value of the output data. However, the hypothesis class selector 120 is not limited to this example. For instance, in accordance with an alternative embodiment, the hypothesis class selector 120 selects, as the hypothesis class, a class that has a lowest value of the output data, a mean value of the output data, or an average value of the output data.

In cases in which the 1-to-n number of classifiable classes exists, and in which an m-th class is selected as the hypothesis class, a hypothesis class vector $h_m$ is defined by the following Equation 2.

$$h_m = (h_1, h_2, \ldots h_n), h_m = 1, h_i = 0, i \neq m \quad \text{[Equation 2]}$$

The data classifier 130 performs the classification algorithm on the present input data x to generate the output data y as represented by the following Equation 3. In one example, the classification algorithm defines a loss function, which is differentiable. The loss function is to output a value that represents a difference between the output result of the classification algorithm and a correct answer, and is a function in which the classification result gets closer to the correct answer, as the output value of the loss function gets smaller.

For example, the classification algorithm applicable to the embodiments may include a neutral network, a convolutional neutral network (CNN), and a recurrent neural network (RNN), but which is not limited thereto.

The output data y is defined as the output vector regarding the n number of classes.

$$y = (y_1, y_2, \ldots, y_n), y_j = P(y=j|x), j=1, \ldots n \quad \text{[Equation 3]}$$

If the output data y regarding the present input data x is generated by the data classifier 130, the data setter 110 modifies the present input data x so as to increase a value $y_m$, wherein the value $y_m$ belongs to the selected hypothesis class among the output data y, and sets the modified input data to new present input data x. The increase in the value belonging to the hypothesis class is pre-set, and the data setter 110 sets each different increase according to the repetition number of the re-classification operations for the present selected hypothesis class.

The data classifier 130 re-classifies the new present input data x by applying the classification algorithm to generate the output data y as represented by Equation 3.

Likewise, an operation to modify and re-classify the input data is repeatedly performed until a satisfactory result of the data classification is acquired. In one embodiment, the satisfactory result occurs in response to the data setter 110 determining that the classification result meets the preset re-classification condition. In response to the preset re-classification condition being met, the data setter 110 modifies the present input data and makes the data classifier 130 re-classify the present input data. In one example, the re-classification condition is to classify the input data in response to a value $y_m$ belonging to the hypothesis class among the output data y being less than a preset threshold. Alternatively, the re-classification condition is to re-classify the input data in response to the value $y_m$ being less than the preset number of the re-classifications. However, the re-classification condition is not limited thereto, and may include a combination of the two conditions above, or other various conditions such as the re-classification condition re-classifying the input data in response to the value $y_m$ being greater than the present number of the re-classifications. Other re-classification conditions associated with the value $y_m$ may be configured in accord with an embodiment.

The result output 140 outputs the present input data x and the output data y as the final data in response to the data setter 110 determining that the classification result is satisfactory enough so that the re-classification is not required.

The output data y, which has been output as the final data, indicates the existence probability of the data of the hypothesis class that is set as the hypothesis. In one example, the input data x indicates the area of the data related thereto. Thus, the result output 140 extracts a region of interest (ROI) by processing the input data x that has been output as the final data. Accordingly, if several objects exist within the initial input data, the result output 140 extracts the area of the desired object as the ROI.

Figure 2:
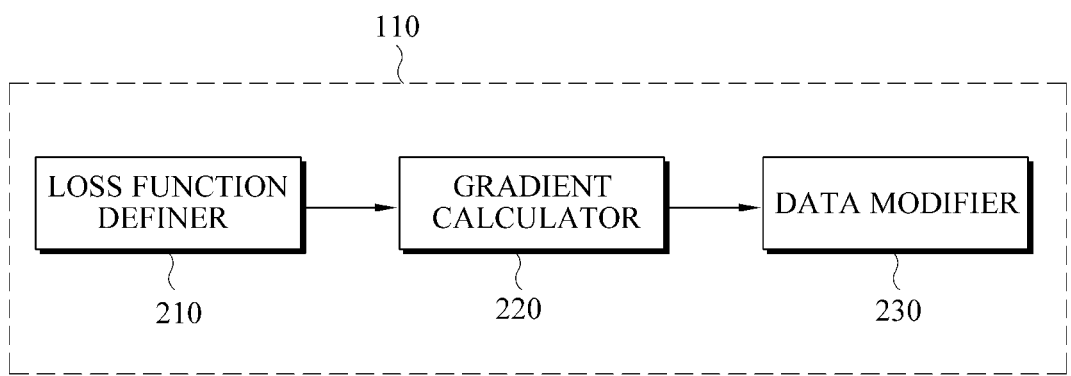
FIG. 2 is a detailed diagram illustrating an example of a data setter in FIG. 1, according to an embodiment.

FIG. 2 is a detailed diagram illustrating an example of a data setter 110 in FIG. 1, in accordance with an embodiment. Referring to FIG. 2, an operation of modifying, by a data setter 110, input data is more specifically described.

As illustrated in FIG. 2, the data setter 110 includes a loss function definer 210, a gradient calculator 220, and a data modifier 230.

The loss function definer 210 defines a loss function with regard to an applied classification algorithm. In general, when a correct answer vector z, indicating that the correct answer with respect to the present input data x is an m-th class, as defined in Equation 4 presented below, a loss function L is defined as shown in Equation 5 presented below by using the correct answer vector z. However, according to an embodiment, the loss function definer 210 defines the loss function L by using the selected hypothesis class vector h as represented by Equation 6, presented below.

$$z_m = (z_1, z_2, \ldots, z_n), z_m = 1, z_i = 0, i \neq m \quad \text{[Equation 4]}$$

$$L(x, z) = -\ln p(z|x) = -\sum_{i=1}^{n} z_i \ln y_i \quad \text{[Equation 5]}$$

$$L(x, h) = -\ln p(h|x) = -\sum_{i=1}^{n} h_i \ln y_i \quad \text{[Equation 6]}$$

The gradient calculator 220 calculates the gradient vector with respect to each value $x_i$ of the present input data x, in response to the loss function L using the hypothesis class based on the hypothesis being defined. Here, the gradient vector of the loss function L is defined as Equation 7.

$$\frac{\partial L(x, h)}{\partial x_i}, i = 1, \ldots, k \quad \text{[Equation 7]}$$

In response to the gradient vector with respect to each value $x_i$ of the present input data x being calculated by the gradient calculator 220, the data modifier 230 modifies the present input data x by using the calculated gradient vector.

For example, the data modifier 230 reduces each of the values $x_i$ of the present input data x by as much as a predefined constant ε in the direction of the gradient, as represented by Equation 8 below, and modifies the present input data x. The data modifier 230 modifies the present input data x by using the gradient descending method. At this time, in response to the proper constant ε being defined or set, the output vector y becomes closer to the hypothesis vector h.

$$x_i = x_i - \varepsilon \frac{\partial L(x, h)}{\partial x_i}, \varepsilon > 0 \quad \text{[Equation 8]}$$

In another example, the data modifier 230 modifies the value $x_i$ to 0 in a case in which the sign of the calculated gradient is equal to the value $x_i$ of the present input data x. In other words, as shown in Equation 8, the value gets larger using the gradient descending method in response to the sign of the present input data being different from the sign of the gradient because the constant ε is the positive number. Thus, in response to the value getting smaller, the data modifier 230 defines or sets the value to 0. Leaving some margins as represented by Equation 9, the data modifier 230 multiplies the gradient with the sign of the value. In a case in which its result is greater than or equal to a specific constant τ, the data modifier 230 modifies its value to 0.

$$x_i = 0 \text{ if } \frac{\partial L(x, h)}{\partial x_i} \cdot \text{sgn}(x_i) > \tau \quad \text{[Equation 9]}$$

Here, the sgn $(x_i)$ indicates a sign of the value $x_i$ of the present input data x.

In yet another example, the data modifier 230 modifies the value $x_i$ to 0 in a case in which the absolute value of the gradient for the value $x_i$ is greater than or equal to a specific constant τ, as represented by Equation 10.

$$x_i = 0 \text{ if } \left| \frac{\partial L(x, h)}{\partial x_i} \right| > \tau \quad \text{[Equation 10]}$$

In yet another example, the data modifier 230 modifies, to 0, the value $x_i$ of the present input data x, which less affects changes to the loss function L by changing the directions of the signs of inequality according to data types in Equations 9 and 10.

In yet another example, the data modifier 230 modifies the input value under the constraint condition that the value $x_i$ of the input data is 0 or the original value, in order to use the method of Lagrange multipliers to find the minimum value of the loss function.

However, the various examples of modifying the present input data x are described and not limited to the descriptions above.

Referring back to FIG. 1, the data setter 110 sets again the modified data to the present input data as described above, re-classifies the preset input data, and increases, by one, the value of the variable to store the number of the modifications of the input data depending on the need.

In one example, an apparatus 100 to classify data repeatedly performs such an operation with respect to a plurality of the hypothesis classes. For example, the apparatus 100 selects, as the hypothesis class, one class among the 1-to-n number of entire classifiable classes, and repeatedly performs the classification and re-classification operations. Afterwards, in response to the classification operation for the hypothesis class being completed, the apparatus 100 selects one hypothesis class among the rest of the unselected classes and repeatedly performs such a classification operation. In one example, the apparatus 100 ends all of the classification operations when the classification operation for the hypothesis class is completed.

In one example, the apparatus 100 selects the hypothesis class to be classified in order among the entire classes based on a user's input as described above. Alternatively, the apparatus 100 is configured to generate initial output data by applying a classification algorithm to initial input data, and select the relevant hypothesis class in order of large output data.

Figure 3A:
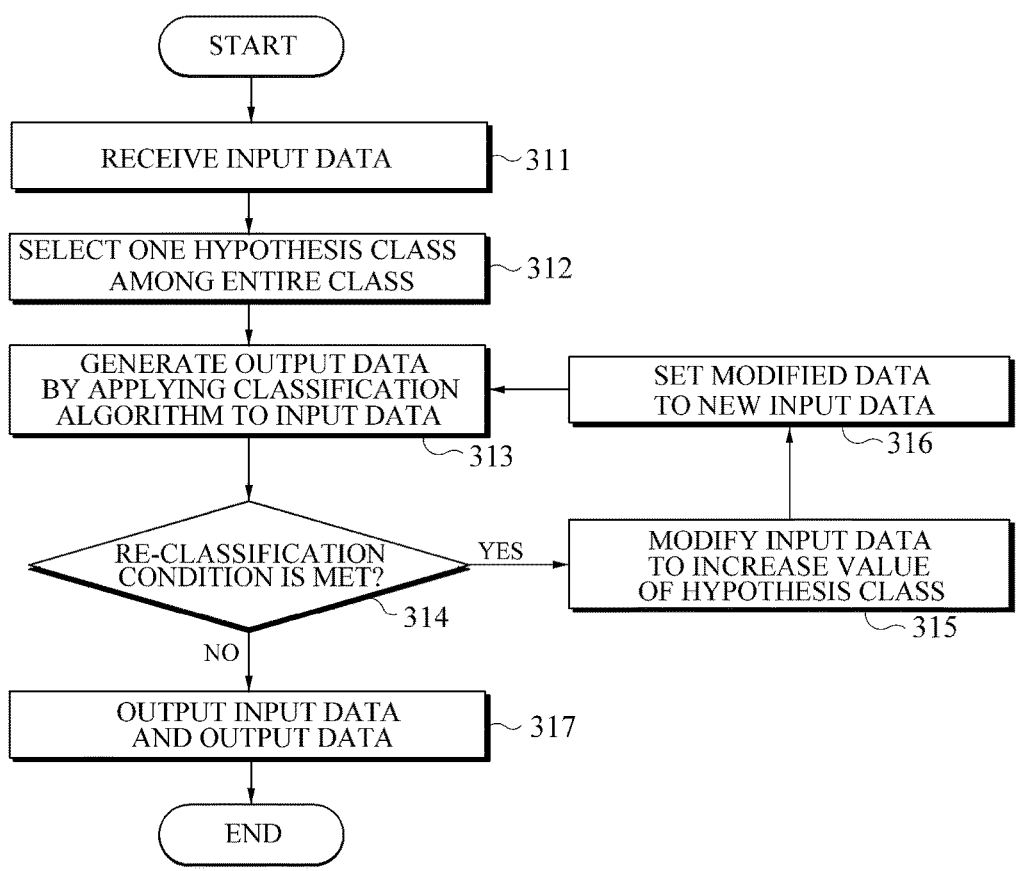
FIGS. 3A and 3B are flowcharts illustrating a method of classifying data, according to embodiments.
Figure 3B:
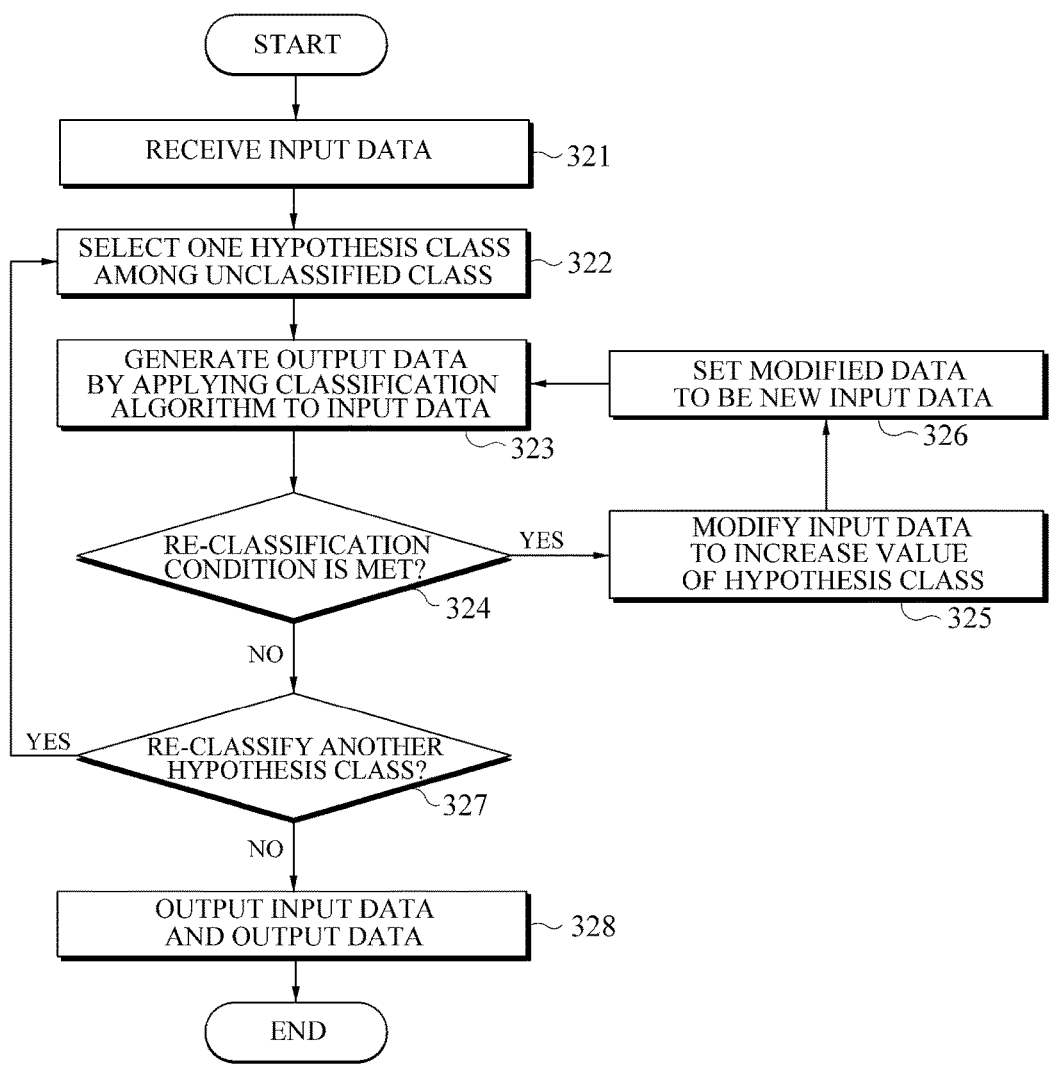

FIGS. 3A and 3B are flowcharts illustrating a method of classifying data, according to embodiments.

FIGS. 3A and 3B are examples of a method of classifying data, which is performed by the apparatus 100 to classify data in FIG. 1.

Referring to FIG. 3A, at operation 311, the apparatus 100 receives input data to be classified. In one example, the input data x is defined as a vector of values $x_i$ of which the length is k as defined in Equation 1. Also, the apparatus 100 sets the received initial input data to the present input data to be classified.

Then, at operation 312, the apparatus 100 selects one hypothesis class from the entire classifiable classes in order to classify the initial input data. In an example, the apparatus 100 selects one class as the hypothesis class based on the user's input. Alternatively, in response to the initial input data being received, the apparatus 100 further performs or executes the classification algorithm on the initial input data, and selects one class as the hypothesis class based on the order of the size of each value among the initial output data that has been generated after the performance. In one example, the vector h of the selected hypothesis class is defined by Equation 2.

In operation 313, the apparatus 100 performs the classification algorithm on the present input data to generate the output data, which is the result of the classification. The classification algorithm of various the embodiments is an algorithm, in which a loss function is definable and differentiable and includes a neutral network, a convolutional neutral network (CNN), and a recurrent neural network (RNN), but is not limited thereto.

In operation 314, the apparatus 100 determines whether to re-classify the input data by determining whether the output data meets re-classification condition. For example, in response to the value, which belongs to the hypothesis class among the output data, being less than a preset threshold, the apparatus 100 determines that the result is not satisfactory, and performs the re-classification. In another example, in response to the value being less than the preset number of the re-classifications, the apparatus 100 performs the re-classification.

Then, in response to determining that the re-classification condition is met, in operation 315, the present input data is modified to increase the value that belongs to the selected hypothesis class among the output data. The operation 315 of modifying the present input data is described with reference to FIG. 4.

In operation 316, for the re-classification, the modified data is set to be new present input data, and the process returns to operation 313.

If it is determined, in operation 314, that the re-classification is completed enough, and the preset re-classification condition is not met, at operation 317, the present input data and output data are output as final data. As such, an ROI is extracted by processing the input data, which has been output as the final data. In one illustrative example, a case in which several objects exist within the initial input data, only the area of the desired object is extracted.

However, FIG. 3B is an example of classifying a plurality of hypothesis classes, and is acquired by changing the operation 312 in FIG. 3A and adding operation 327 to FIG. 3B.

Referring to FIG. 3B, an apparatus to classify data receives input data in 321 and sets the received input data to be present input data for data classification.

Also, at operation 322, the apparatus 100 selects one class that has not been classified as a hypothesis class among entire classifiable classes. In accordance with an embodiment, according to a user's input, the hypothesis class is selected in an order. Alternatively, the apparatus 100 applies the classification algorithm to the initially received input data so as to, in advance, generate initial output data. The hypothesis class is selected, in an order, among the unselected hypothesis classes. The hypothesis class is selected according to the size of a value, which belongs to each class, from a resultant initial output data.

At operation 323, the apparatus 100 applies a classification algorithm to the present input data, output data is generated.

At operation 324, the apparatus 100 determines whether to re-classify the present selected hypothesis class, which is, in other words, whether the re-classification condition is met. In operation 325, in response to the re-classification condition being met, the apparatus 100 modifies the present input data to increase a value belonging to the present selected hypothesis class. At operation 326, the apparatus 100 sets the modified data to new present input data for re-classification, and the method proceeds to operation 323. Then, the apparatus 100 may repeatedly perform the following operations.

In operation 327, in response to the re-classification condition for the present selected hypothesis class not being met in operation 324, the apparatus 100 determines whether to re-classify another hypothesis class.

If it is determined that the re-classification operation is to be performed with regard to another hypothesis class, the flow returns to operation 322, and the apparatus 100 repeatedly performs the operations of selecting one hypothesis class among the classes which have not been re-classified and re-classifying the selected classes.

In a case in which the apparatus 100 performing the method determines that the re-classification operation with regard to a sufficient amount of hypothesis classes is completed, in operation 328, the apparatus 100 outputs the present input data and output data, which are generated by the re-classification operation with regard to all hypothesis classes.

Figure 4:
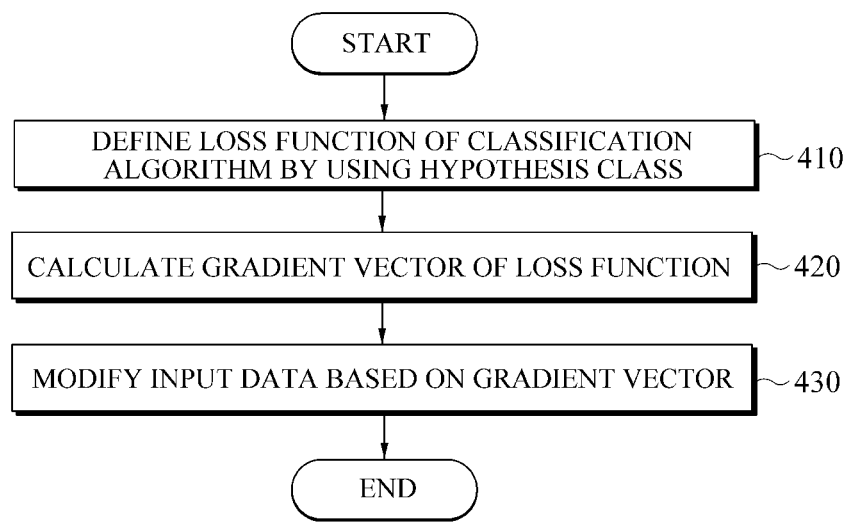
FIG. 4 is a detailed flowchart illustrating methods of modifying input data in FIGS. 3A and 3B, according to an embodiment.

FIG. 4 is a detailed flowchart illustrating methods of modifying input data in FIGS. 3A and 3B, in accordance with an embodiment.

FIG. 4 illustrates an example to perform operations 315 and 325 of modifying input data.

If operations 315 and 325 of modifying input data are described more specifically with reference to FIG. 4, in operation 410, the apparatus 100 to classify data defines the loss function of the predefined classification algorithm using the present selected hypothesis class. In one example, the loss function is defined as Equation 6 regarding not a correct answer class, but a hypothesis class as described above.

At operation 420, the gradient of the defined loss function is calculated for each value of the present input data.

At operation 430, the input data is modified based on the gradient that has been calculated with respect to each value of the present input data.

In one embodiment, as represented by Equation 8, each of the values of the present input data is reduced by as much as the predefined constant in the direction of the gradient so that the present input data is modified. In one example, in response to the constant being properly set, the output vector becomes closer to the hypothesis vector.

In another example, in response to the sign of the calculated gradient being the same as one value of the present input data, the value is modified to 0. In one example, leaving some margins, as represented by Equation 9, the value is modified to 0 when the value is greater than or equal to a specific constant.

In yet another example, in a case in which the absolute value of the gradient for each value $x_i$ of the present input data is greater than or equal to a specific constant, as represented by Equation 10, the value is modified to 0.

In yet another example, the value of the present input data that least affects changes to the loss function is modified to 0 by changing the directions of the signs of inequality in Equations 9 and 10, according to the types of data.

In yet another example, the input value is modified under the constraint condition that the value $x_i$ of the input data is 0 or the original value so as to use the method of Lagrange multipliers to find the minimum value of the loss function.

Figure 5:
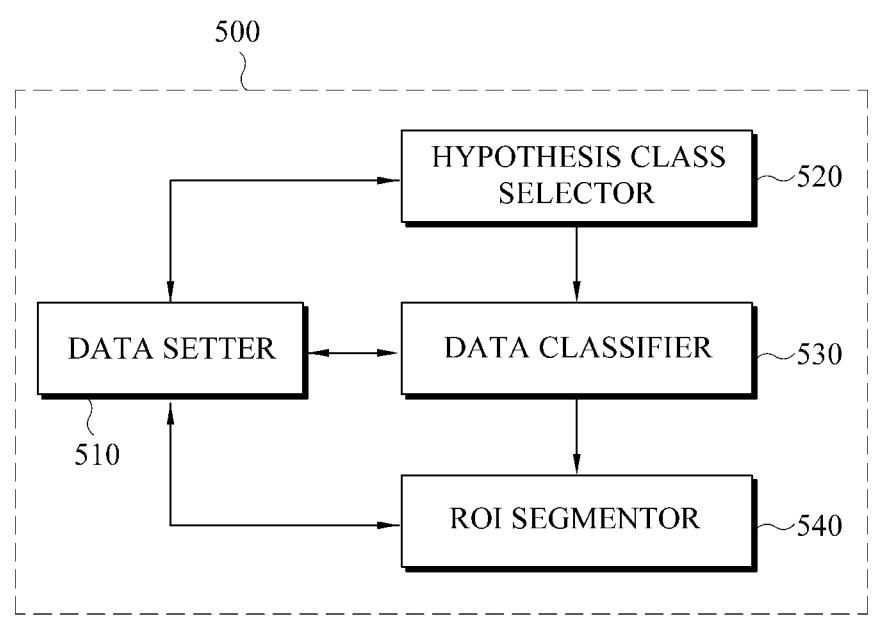
FIG. 5 is a diagram illustrating an apparatus to segment a region of interest (ROI), according to an embodiment.
Figure 6:
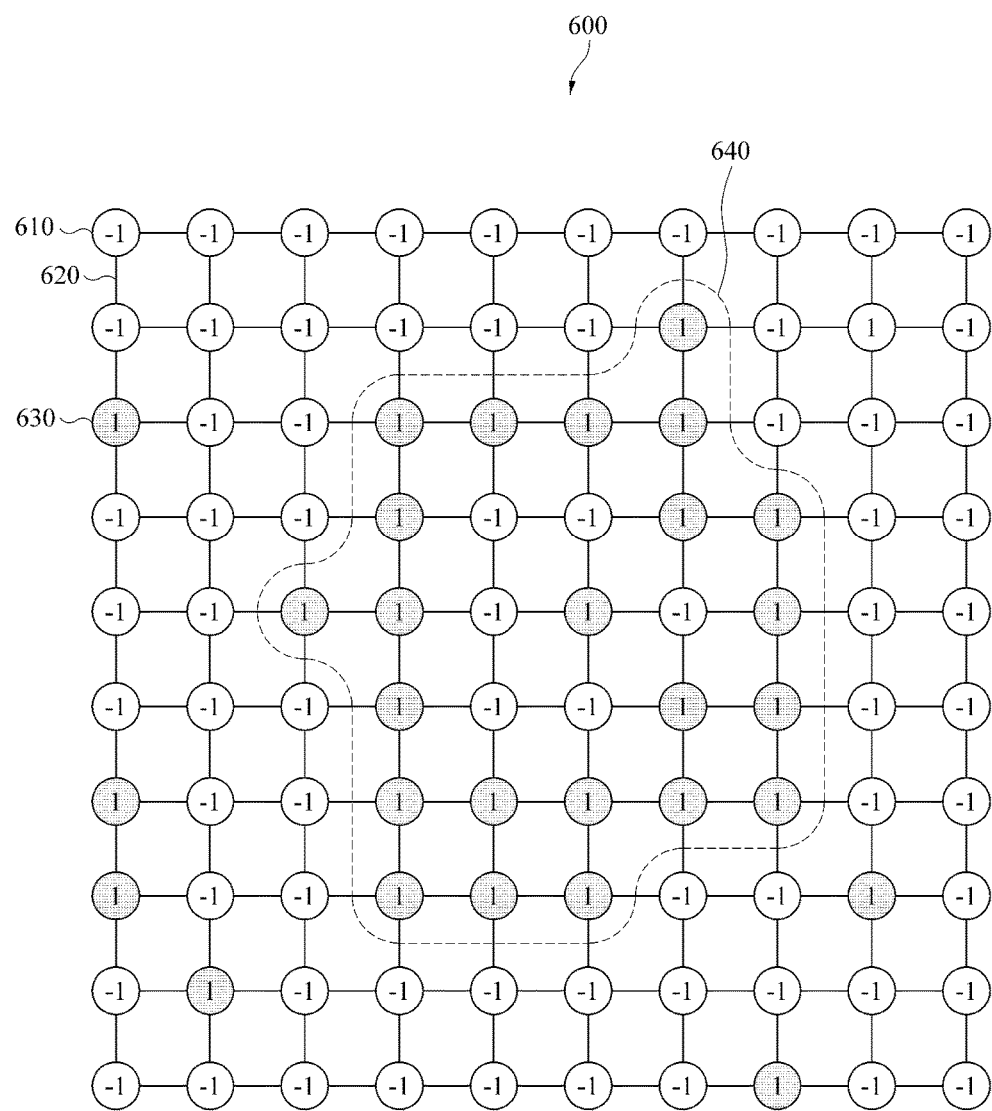
FIG. 6 is a diagram illustrating an example for segmenting an ROI from image data, according to an embodiment.

FIG. 5 is a diagram illustrating an apparatus for segmenting a region of interest (ROI), according to an embodiment. FIG. 6 is a diagram illustrating an example for segmenting an ROI from image data, in accordance to an embodiment.

Hereinafter, for convenience of description, the detailed description for an apparatus 500 for segmenting an ROI may be omitted within the overlapped range with the description of the apparatus 100, which are mentioned above with reference to FIGS. 1 and 2. Thus, it should be understood that the apparatus 500 includes all the above-mentioned embodiments with regard to the components that are overlapped with the apparatus 100 for classifying data.

Referring to FIG. 5, the apparatus 500, which segments ROIs from input data of various types, includes a data setter 510, a hypothesis class selector 520, a data classifier 530, and an ROI segmentor 540

The data setter 510 receives input data to detect and segment an ROI. In one example, the received input data includes various types of data, such as an image data and an audio data.

The hypothesis class selector 520 selects one hypothesis class among the entire classifiable classes.

The data classifier 530 applies a predefined classification algorithm to the received input data to generate the output data, which is the result of the classification. In one example, the output data is output in a vector form having the probabilities of the entire classifiable classes as described above.

The data setter 510 modifies the input data to increase the value that belongs to the selected hypothesis class among the output data.

In one example, the data setter 510 includes a loss function definer, a gradient calculator, and a data modifier, as described above in FIG. 2. The loss function definer defines a loss function regarding a classification algorithm using the selected hypothesis class. The gradient calculator calculates the gradient of the loss function with regard to each value of the input data. The data modifier modifies the input data using the calculated gradient.

In the direction in which the gradient descends, each value of the input data is reduced by as much as a specific positive value. In another example, the value in which the input data has the same sign as the calculated gradient is modified to 0.

In one example, when the result from multiplying the sign of each value of the gradient and the input data is greater than or equal to a specific constant, the value is modified to 0. In yet another example, when the absolute value of the gradient for each value of the input data is greater than or equal to a specific constant, the value is modified to 0. In yet another example, the value of the present input data which less affects changes to the loss function is modified to 0 by changing the directions of the signs of inequality according to data types.

The ROI segmentor 540 segments one or more areas from the modified input data to be the ROIs based on the modification result of the input data.

In one example, the ROI segmentor 540 segments one or more areas, in which values are increased, as the ROIs from the modified input data by using a segmentation algorithm. In an embodiment, the segmentation algorithm is a graph cut algorithm, a conditional random field (CRF) algorithm, but it is not limited thereto.

In FIG. 6, the data setter 510 segments an ROI, according to types of input data. FIG. 6 is an example of image data 600. As illustrated in FIG. 6, the two-dimensional image data 600 is a graph that includes (1) node 610 or 630 for each pixel, and (2) edges 620 to connect the nodes 610 and 630 in a grid shape, which have no direction. When the input data is modified based on the loss function, as described above, the data setter 510 assigns the value '−1' to the data node 610, of which the value is deleted to be '0', and the value '1' to the node 630, of which the value is not deleted.

The ROI segmentor 540 segments one or more areas 640 from such modified image data by using segmentation algorithms, such as the graph cut algorithm or the CRF algorithm. Generally, because a certain object in the image data 600 is continuous in space, the ROI is required to be continuous in the two-dimensional space. Thus, the ROI segmentor 540 segments the area 640, where the values allocated to '1' are continuous, by using such a feature. As such, the segmented area is an ROI of a user.

In accordance with an example, there may be two or more areas associated with one selected hypothesis, such as, segmented parts acquired from one object that is segmented by being hidden by another object, exist in the input data. In another example of two or more areas associated with one selected hypothesis, a variety of the same types of objects exist in the input data. In either of such examples, the ROI segmentor 540 may repeatedly segment the graph into two or more or in group of two depending on the need. As such, each of the areas is re-segmented, respectively, or is re-segmented in one process. Considering the case in which the related area is not found enough using the classification algorithm, the cut area expands spatially as much as a specific size or at a specific ratio.

The one-dimensional input data, such as, voice data, is shown in the graphs, which are connected in a time axis by using each time point as nodes. As such, the areas that are continuous in time are separated into ROIs in the same manner as in the graphs connected in the time axis.

The data setter 510 determines whether to perform the re-segmentation if the ROI is segmented. If it is determined that the re-segmentation is to be performed, the data setter 510 is configured to set the modified data to be new input data and requesting the data classifier 530 to perform the re-classification. Such a method is repeated until the method determines that the re-segmentation is not to be performed.

In an embodiment, when the re-segmentation condition is not met, such as the case in which the segmentation process is performed more than the predefined number of times, the data setter 510 determines that the re-segmentation is not to be performed.

In another embodiment, the data setter 510 displays the received input data and the segmentation result of the ROI on the screen and receives information regarding whether the re-segmentation is performed by a user who has checked the segmentation result. Based on the information indicating whether the re-segmentation is performed, which is received from the user, the data setter 510 determines whether the re-segmentation is performed.

Figure 7:
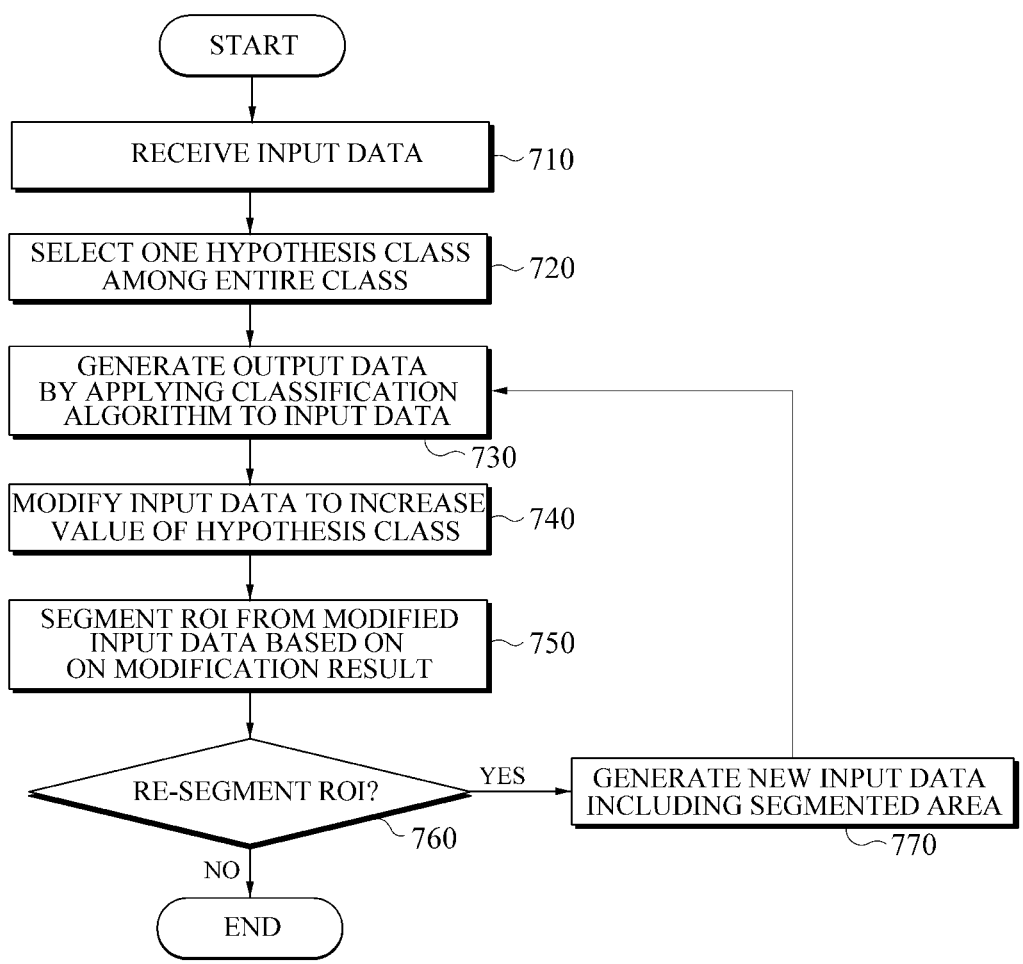
FIG. 7 is a flowchart illustrating a method of segmenting an ROI, according to an embodiment.

FIG. 7 is a flowchart illustrating a method of segmenting an ROI, according to an embodiment.

FIG. 7 may be one example of a segmentation method performed by an apparatus 500 for segmenting an ROI in FIG. 5.

In operation 710, the apparatus 500 as illustrated in FIG. 5, receives input data to be segmented. In one example, the input data includes various types of data, such as voice data and video data.

At operation 720, the apparatus 500 selects one hypothesis class to be predicted to be a correct answer.

At operation 730, the apparatus 500 outputs the output data, which is the probability of the entire classes, in a vector form by applying a classification algorithm to the input data.

At operation 740, the apparatus 500 modifies the input data to increase the value belonging to the hypothesis class among the output data.

At operation 750, based on the modification result of the input data, the apparatus 500 segments one or more areas as ROIs from the modified input data. As described above with reference to FIG. 6, one or more continuous areas are segmented as ROIs according to types of input data. In one example, the continuous space is segmented from the input data by using the predefined segmentation algorithm, such as a graph cut algorithm or a CRF algorithm.

Because there may be two or more areas corresponding to one selected hypothesis, operation 750 of the method includes segmenting repeatedly the graph into two or more or in group of two.

The setter, classifier, selector, output, modifier, definer, calculator, segmentor, and other components illustrated in FIGS. 1, 2, and 5 that perform the operations described herein with respect to FIGS. 3A, 3B, 4, and 7 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 3A, 3B, 4, and 7. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3A, 3B, 4, and 7 that perform the operations described herein with respect to FIGS. 1, 2, and 5 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of classifying data, comprising:
   selecting a hypothesis class among entire classes;
   generating output data with regard to the entire classes by applying a classification algorithm to input data;
   modifying the input data to increase a value of the hypothesis class among the output data and setting the modified input data to be new input data in response to a determination that the re-classification condition is met; and
   outputting the input data and the output data in response to a determination that the re-classification condition is not met.

2. The method of claim 1, wherein the re-classification condition comprises at least one of a value of the hypothesis class being lower than a preset threshold and a number of a re-classification iteration being lower than a preset number of the re-classifications.

3. The method of claim 1, wherein the modifying of the input data comprises:
   defining a loss function of the classification algorithm using the hypothesis class,
   calculating a gradient vector of the defined loss function, and
   modifying the input data on a basis of the gradient vector.

4. The method of claim 3, wherein the modifying of the input data on a basis of the gradient vector comprises reducing each value of the input data by a preset positive value in a direction of a gradient.

5. The method of claim 3, wherein the modifying of the input data on a basis of the gradient vector comprises:
   for each value of the input data, modifying to 0 a value of the input data in which a result from multiplying a sign and a gradient of each value is greater than or equal to a reference value, or a value of the input data, in which an absolute value of the gradient is greater than or equal to the reference value.

6. The method of claim 3, wherein the modifying of the input data on a basis of the gradient vector comprises:
   reducing, in the direction in which a gradient descends, each value of the input data by a positive value.

7. The method of claim 1, further comprising:
   generating initial output data of the entire classes by applying the classification algorithm to the received input data, and wherein the selecting of the hypothesis class is performed on a basis of a size of each value of the initial output data.

8. The method of claim 1, wherein the classification algorithm is one of a neural network, a convolutional neural network (CNN), and a recurrent neural network (RNN).

9. An apparatus to classify data, comprising:
one or more processors configured to:
select one hypothesis class among entire classes;
generate output data with regard to the entire classes by applying a classification algorithm to input data; and
modify input data to increase a value of the hypothesis class among the output data and set the modified input data to new input data, in response to a determination that a re-classification condition is met; and
output the input data and the output data, in response to a determination that a re-classification condition is met.

10. The apparatus of claim 9, wherein the re-classification condition comprises at least one of a value of the hypothesis class being lower than a preset threshold and a value of the hypothesis class being lower than a preset number of the re-classifications.

11. The apparatus of claim 9, wherein, for the modifying of the input data, the one or more processors are configured to:
define a loss function of the classification algorithm by using the hypothesis class;
calculate a gradient vector with respect to the defined loss function; and
modify the input data on a basis of the gradient vector.

12. The apparatus of claim 11, wherein, for the modifying the input data on the basis of the gradient vector, the one or more processors are is configured to reduce each value of the input data by a preset positive in a direction of a gradient.

13. The apparatus of claim 11, wherein, for the modifying the input data on the basis of the gradient vector, the one or more processors are is configured to, for each value of the input data, modify to 0 a value of the input data in which a result from multiplying a sign and a gradient of each value is greater than or equal to a reference value, or a value of the input data in which an absolute value of the gradient is greater than or equal to the reference value.

14. The apparatus of claim 11, for the modifying the input data on the basis of the gradient vector, the one or more processors are configured to modify the input data on a basis of the gradient vector by reducing, in the direction in which a gradient descends, each value of the input data by a positive value.

15. The apparatus of claim 9, wherein, for the selection of the one hypothesis class, the one or more processors are configured to generate initial output data with respect to the entire classes by applying the classification algorithm to the received input data and select the hypothesis class on a basis of a size of each value of the initial output data.

16. The apparatus of claim 9, wherein the classification algorithm is one of a neural network, a convolutional neural network (CNN), and a recurrent neural network (RNN).

17. A processor-implemented method of segmenting a region of interest (ROI), comprising:
selecting one hypothesis class among entire classes;
generating output data with regard to the entire classes by applying a classification algorithm to input data;
modifying the input data to increase a value of the hypothesis class among the output data; and
segmenting, as an ROI, an area from the modified input data based on the modifying.

18. The method of claim 17, further comprising:
in response to a determination that the ROI is to be re-segmented, generating new input data that comprises the segmented area that is continuous; and
repeatedly performing operations subsequent to the generating of the output data.

19. The method of claim 17, wherein the segmenting of the area comprises segmenting a continuous area, of which a value is increased as the ROI from the modified input data by using a segmentation algorithm.

20. The method of claim 19, wherein the segmentation algorithm comprises at least one of a graph cut algorithm and a conditional random field (CRF) algorithm.

21. The method of claim 17, wherein the modifying of the input data comprises:
defining a loss function of the classification algorithm using the hypothesis class;
calculating a gradient vector of the defined loss function; and
modifying the input data based on the gradient vector.

22. An apparatus to segment a region of interest (ROI), comprising:
one or more processors configured to:
select a hypothesis class among entire classes;
generate output data about the entire classes by applying a classification algorithm to input data;
modify the input data to increase a value of the hypothesis class among the output data and outputting a modification result indicative thereof; and
segment, as an ROI, an area from the modified input data based on the modification result.

23. The apparatus of claim 22, wherein, in response to a determination that the ROI is to be re-segmented, the one or more processors are configured to generate new input data that comprises the one or more segmented areas.

24. The apparatus of claim 22, wherein the one or more processors are configured to segment a continuous area, of which values are increased, as the ROI from the modified input data using a segmentation algorithm.

25. The apparatus of claim 24, wherein the segmentation algorithm comprises at least one of a graph cut algorithm and a conditional random field (CRF) algorithm.

26. The apparatus of claim 22, wherein, for the modifying of the input data, the one or more processors are configured to:
define a loss function of the classification algorithm using the hypothesis class;
calculate a gradient vector of the defined loss function; and
modify the input data on a basis of the gradient vector.

* * * * *